US010368008B2

(12) United States Patent
Fujita (10) Patent No.: US 10,368,008 B2
(45) Date of Patent: Jul. 30, 2019

(54) IMAGING APPARATUS AND CONTROL METHOD WHEREIN AUTO BRACKET PARAMETERS AND IMAGE PROCESSES APPLIED ARE DETERMINED FROM IMAGE ANALYSIS

(71) Applicant: CANON KABUSHIKI KAISHA, Tokyo (JP)

(72) Inventor: Atsushi Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 14/299,967

(22) Filed: Jun. 9, 2014

(65) Prior Publication Data

US 2014/0362247 A1 Dec. 11, 2014

(30) Foreign Application Priority Data

Jun. 11, 2013 (JP) .................................. 2013-123215
May 14, 2014 (JP) .................................. 2014-100824

(51) Int. Cl.
*H04N 5/228* (2006.01)
*H04N 5/235* (2006.01)

(52) U.S. Cl.
CPC .................................. *H04N 5/2356* (2013.01)

(58) Field of Classification Search
CPC ........... H04N 5/907; H04N 2201/3259; H04N 9/8205; H04N 2101/00; H04N 2201/0084; H04N 2201/3252; H04N 1/32128; H04N 5/232; H04N 5/2352; H04N 5/772
See application file for complete search history.

(56) References Cited

U.S. PATENT DOCUMENTS

| | | | | |
|---|---|---|---|---|
| 2006/0216016 A1* | 9/2006 | Eun | .................. | G03B 17/02 396/222 |
| 2008/0088710 A1* | 4/2008 | Iwamoto | ............ | H04N 1/32128 348/220.1 |
| 2008/0122944 A1 | 5/2008 | Zhang | | |
| 2010/0194963 A1* | 8/2010 | Terashima | .......... | G06F 17/3028 348/333.11 |
| 2010/0289916 A1* | 11/2010 | Battles | .................. | H04N 5/235 348/222.1 |
| 2011/0074971 A1* | 3/2011 | Kwon | .................... | H04N 5/232 348/222.1 |

FOREIGN PATENT DOCUMENTS

| | | |
|---|---|---|
| CN | 101222582 A | 7/2008 |
| CN | 101557469 A | 10/2009 |

(Continued)

*Primary Examiner* — Sinh Tran
*Assistant Examiner* — Selam T Gebriel
(74) *Attorney, Agent, or Firm* — Canon U.S.A., Inc. IP Division (57) ABSTRACT

An imaging apparatus is provided which allows acquisition of a plurality of images in response to one instruction to generate images without requiring a user to perform complicated setting operations and advanced knowledge. A control unit in the imaging apparatus selects a photographing parameter to be changed for the auto bracketing from a plurality of photographing parameters based on a result of analysis on an image captured in advance by the imaging unit and sets a variance range of values of the selected photographing parameters based on a category instructed by a user.

8 Claims, 9 Drawing Sheets

(56) References Cited

FOREIGN PATENT DOCUMENTS

| CN | 101800857 A | 8/2010 |
|---|---|---|
| JP | 2006-067464 A | 3/2006 |
| JP | 2008-187498 A | 8/2008 |
| JP | 2010-199727 A | 9/2010 |
| JP | 2011-180844 A | 9/2011 |
| JP | 2012-151901 A | 8/2012 |
| JP | 2012-231432 A | 11/2012 |

* cited by examiner

| NAME OF SPECIAL EFFECT | CATEGORY | OUTLINE OF PROCESS |
|---|---|---|
| MONOCHROME | MONOTONE | SET COLOR SATURATION TO ZERO |
| HIGH CONTRAST MONOCHROME | MONOTONE | SET COLOR SATURATION TO ZERO TO RAISE CONTRAST |
| SEPIA TONE | MONOTONE | CONVERT TO SEPIA IMAGE |
| BRIGHT | COLORFUL | EMPHASIZE COLOR SATURATION |
| POSTER COLOR | COLORFUL | REDUCE SHADES OF GRAY TO EMPHASIZE COLOR SATURATION |
| HIGH KEY 1 | HIGH KEY | INCREASE BRIGHTNESS, COLOR THE WHOLE IN GREEN, AND CONVERT COLOR PHASE |
| HIGH KEY 2 | HIGH KEY | INCREASE BRIGHTNESS, COLOR THE WHOLE IN RED, AND CONVERT COLOR PHASE |
| LOW KEY 1 | LOW KEY | REDUCE BRIGHTNESS, COLOR THE WHOLE IN GREEN, AND CONVERT COLOR PHASE |
| LOW KEY 2 | LOW KEY | REDUCE BRIGHTNESS, COLOR THE WHOLE IN RED, AND CONVERT COLOR PHASE |
| HIGH DYNAMIC RANGE | VARIETY | GENERATE HIGH DYNAMIC RANGE IMAGE THROUGH SYNTHESIS |
| DIORAMA | VARIETY | GENERATE DIORAMA IMAGE THROUGH IMAGE SYNTHESIS |
| POSTERIZATION | VARIETY | POSTERIZATION PROCESS |
| . . . | . . . | . . . |

FIG. 9B

| NAME OF SPECIAL EFFECT | CATEGORY | OUTLINE OF PROCESS |
|---|---|---|
| MAGENTA | COLORFUL | COLOR THE WHOLE IN MAGENTA |
| CYAN | COLORFUL | COLOR THE WHOLE IN CYAN |
| . . . | . . . | . . . |

IMAGING APPARATUS AND CONTROL METHOD WHEREIN AUTO BRACKET PARAMETERS AND IMAGE PROCESSES APPLIED ARE DETERMINED FROM IMAGE ANALYSIS

BACKGROUND OF THE INVENTION

1. Field of the Invention

The present invention relates to imaging apparatuses and image processing apparatuses which generate a plurality of images in response to one image generation instruction.

2. Description of the Related Art

Aspects of photography of even one photographing scene may vary in accordance with settings for photographing conditions (such as exposure amount, focus position, white balance (WB)) of an imaging apparatus. Because of this, it may not be easy for a user to select an optimal photographing condition for a given photographing scene. Accordingly, imaging apparatuses have been known conventionally which perform auto bracketing by changing exposure amount, focus position or WB settings in a case where a user captures a scene, such as a scene in which a plurality of subjects exist, or a high contrast scene, for which photographing conditions are difficult to set.

Japanese Patent Laid-Open No. 2006-67464 discloses a digital camera supporting auto bracketing. The digital camera disclosed in Japanese Patent Laid-Open No. 2006-67464 is used to capture one subject based on a plurality of parameters, generates a plurality of images, and displays the plurality of images at different times corresponding to levels of the parameters.

However, for effective use of functions involved in auto bracketing as in the camera disclosed in Japanese Patent Laid-Open No. 2006-67464, proper parameters for auto bracketing may be required to be set in accordance with a given photographing scene. This may require complicated setting operations and advanced knowledge for performing auto bracketing, which makes it difficult to implement auto bracketing suitable for a given photographing scene.

Possibly, a plurality of images may be generated by performing a plurality of image processes with different parameters set for one input image, instead of generation of a plurality of images by performing auto bracketing. However, even when such image processes are performed to obtain the same effect as that of auto bracketing, setting proper parameters therefor may still require complicated setting operations and advanced knowledge.

SUMMARY OF THE INVENTION

The present invention was made in view of such situations and allows acquisition of a plurality of images in response to one instruction to generate images without requiring a user to perform complicated setting operations and advanced knowledge.

According to one aspect of the present invention, there is provided an imaging apparatus including an imaging unit and a control unit configured to cause the imaging unit to perform auto bracketing, wherein the control unit selects a photographing parameter to be changed for the auto bracketing from a plurality of photographing parameters based on a result of analysis on an image captured in advance by the imaging unit and sets a variance range of values of the selected photographing parameters based on a category instructed by a user.

According to another aspect of the present invention, there is provided an image processing apparatus including an image processing unit configured to generate a plurality of output images by performing a plurality of modification processes on input images, and a control unit configured to set the plurality of modification processes, wherein the control unit selects the plurality of modification processes based on results of analysis on the input images and a category instructed by a user.

Further features of the present invention will become apparent from the following description of exemplary embodiments with reference to the attached drawings.

DESCRIPTION OF THE EMBODIMENTS

Exemplary embodiments of the present invention will be described in detail with reference to drawings. Like numbers refers like parts throughout the figures, and repetitive descriptions will be omitted.

Figure 1:
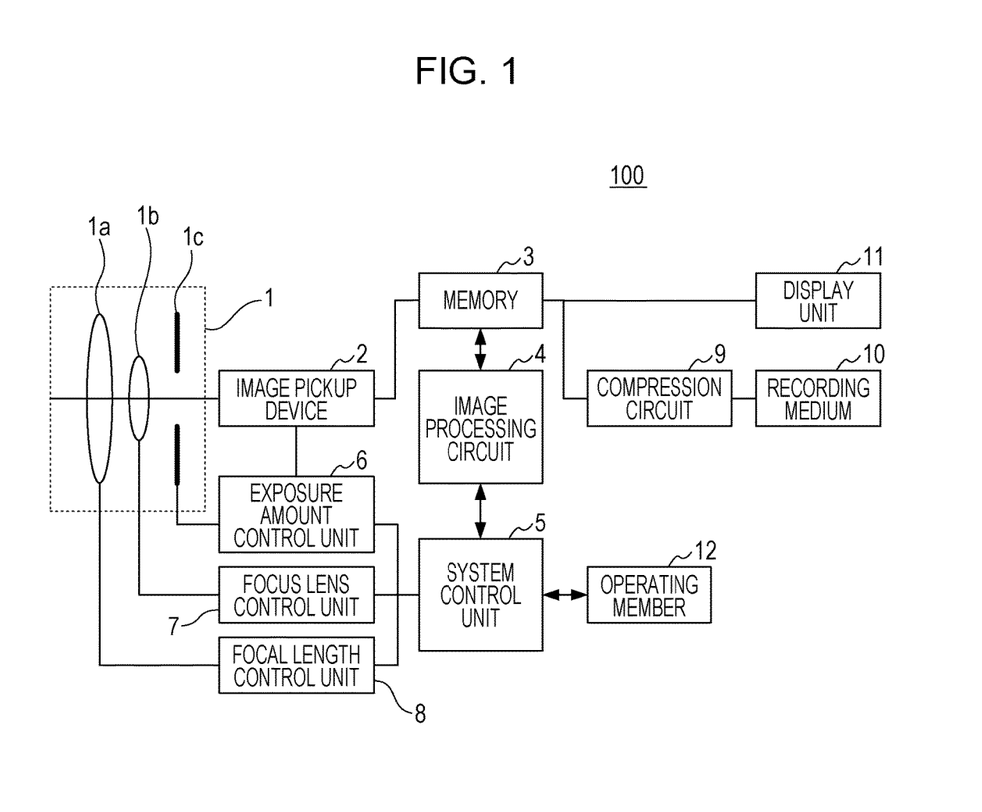
FIG. 1 is a block diagram illustrating an imaging apparatus.

Referring to FIG. 1 first, a configuration of an imaging apparatus corresponding to an image processing apparatus according to this exemplary embodiment will be described. FIG. 1 is a block diagram illustrating an imaging apparatus 100. An imaging optical system 1 includes a plurality of lenses including a zooming lens 1a, a focus lens 1b (ranging lens), and a diaphragm mechanism 1c.

An image pickup device 2 may be configured by a CCD or a CMOS sensor and performs photoelectric conversion on a subject image obtained through the imaging optical system 1 (hereinafter, simply called a subject image) to generate an electric signal (or an analog signal). The image pickup device 2 includes an A/D converter configured to convert an analog signal to a digital signal. A surface of the image pickup device 2 is covered by an RGB color filter such as a Bayer pattern such that it is capable of performing color photographing. When a subject image is focused on the image pickup device 2, image data (image signal) is generated and is stored in a memory 3. The memory 3 holds an image signal generated by the image pickup device 2 or data required for an image process.

An image processing circuit 4 performs image processes such as an interpolation process and a color conversion process on a predetermined pixel of an image signal held in the memory 3. The image processing circuit 4 uses image data obtained by imaging to perform a predetermined calculation process, determines a photographing condition based on an obtained calculation result, and notifies the photographing condition to a system control unit 5. The image processing circuit 4 is further capable of analyzing an image and performing a filtering process, a synthesis process, and so on and selects an image process for bracketing (hereinafter, which will be called bracketing image process) suitable for a given photographing scene in accordance with an algorithm, which will be described below.

The system control unit 5 controls the imaging apparatus 100 overall. The system control unit 5 has centralized control of a shutter speed, a diaphragm mechanism, a focus lens, and a zooming lens by controlling an exposure amount control unit 6, a focus lens control unit 7, and a focal length control unit 8 in order to perform photographing under the photographing condition determined by the image processing circuit 4.

The exposure amount control unit 6 adjusts an exposure time and a photographing sensitivity for the diaphragm mechanism 1c in the imaging optical system 1 and the image pickup device 2 for proper exposure amount control. The focus lens control unit 7 controls the focus lens 1b in the imaging optical system 1. The focal length control unit 8 controls the zooming lens 1a in the imaging optical system 1 to change its focal length in response to an instruction from the system control unit 5.

The compression circuit 9 may compress an image held in the memory 3 to a JPEG image, for example. An image generated by the compression circuit 9 (hereinafter called a compressed image) is recorded in a recording medium 10. A display unit 11 reads out a captured image generated by the image processing circuit 4 from the memory 3 and a displays it on an LCD provided in the imaging apparatus 100 or on an external monitor.

The operating member 12 may include a button and a touch panel and receive an instruction from a user (hereinafter, called a user instruction). The system control unit 5 may change a photographing operation to be performed in response to a user instruction input through the operating member 12.

According to this exemplary embodiment, in the imaging apparatus 100, an imaging apparatus main body having the image pickup device 2 and the imaging optical system 1 are provided integrally. However, not limiting to it, this exemplary embodiment is applicable to an imaging system in which an imaging optical system detachably attached to an imaging apparatus main body.

Figure 2:
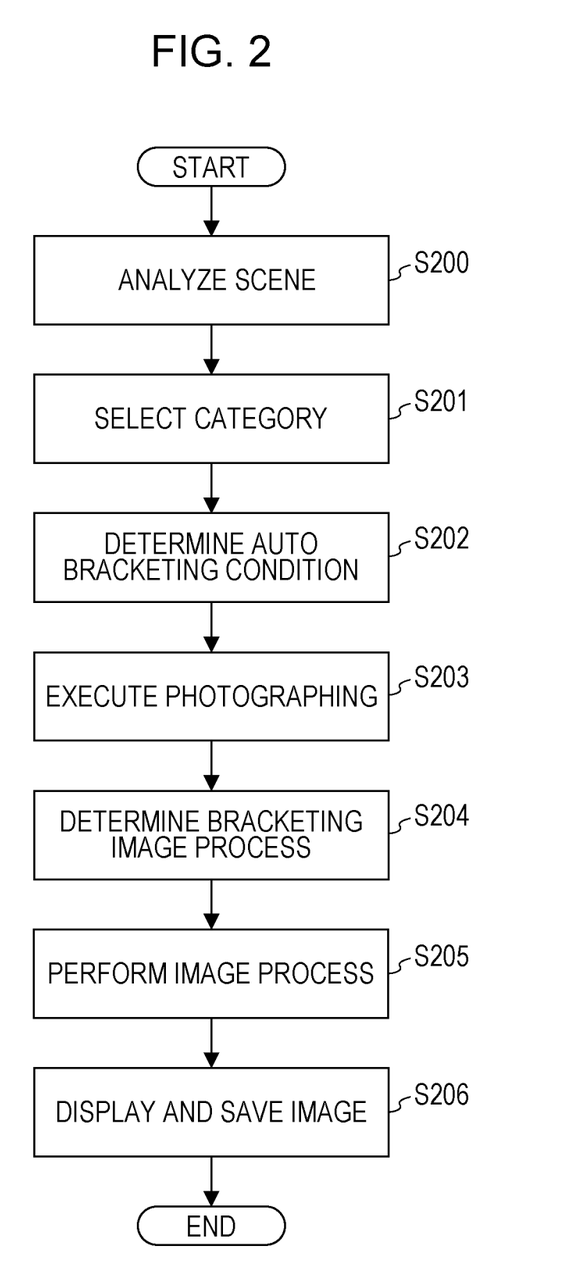
FIG. 2 is a flowchart illustrating an auto bracketing processing.

Next, an algorithm for auto bracketing processing to be performed by the imaging apparatus 100 of this exemplary embodiment will be described with reference to FIG. 2. FIG. 2 is a flowchart illustrating auto bracketing processing. Steps in FIG. 2 are generally performed in response to commands from the system control unit 5. The imaging apparatus 100 generates a plurality of images by automatically changing the photographing parameter and image process parameter therefor in response to one image generation instruction from a user. An image generation instruction according to this exemplary embodiment corresponds to a photographing instruction given by fully pressing by a user a release button, not illustrated, included in the imaging apparatus 100.

First, in step S200, the system control unit 5 analyzes (or judges) a given photographing scene. The judgment of a photographing scene is performed while a moving image is being displayed on an electronic viewfinder (EVF) (in a photographing standby state). More specifically, according to this exemplary embodiment, for analysis of a photographing scene, a subject is detected from a moving image by performing human figure detection with face detection or main subject detection, for example, to detect a motion of the imaging apparatus 100 or the subject. If a face is detected from the moving image, the system control unit 5 judges that the subject is a human figure. If a region having an area equal to or larger than a threshold value and being regarded as having an equal distance to the imaging apparatus is detected in vicinity of a screen center, the subject is judged as an object. The image displayed on the electronic viewfinder (EVF) further undergoes histogram analysis and focus scan. The system control unit 5 judges a given photographing scene based on a subject detection result, a motion detection result, a histogram analysis result, and AF information. However, not limiting to it, this exemplary embodiment may use other kinds of information to judge a given photographing scene.

Next, in step S201, a category instruction is received from a user through the operating member 12. Here, the term "category" refers to a tendency of a special effect process, which will be described below. A user may operate the operating member 12 to select one category from a plurality of preset categories.

Figure 3A:
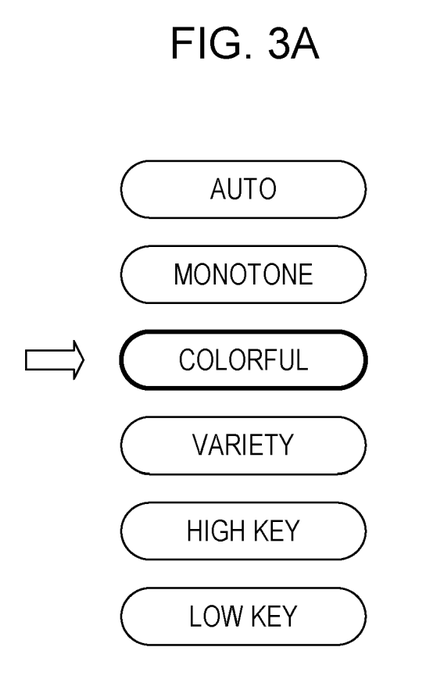
FIG. 3A illustrates an example of a user interface usable for selecting a category.

FIG. 3A illustrates examples of a category classification and a category selection screen.

FIG. 3A illustrates an example of a user interface (hereinafter, called a UI) which allows selection of one category from six categories of AUTO, MONOTONE, COLORFUL, VARIETY, HIGH KEY, AND LOW KEY. Thus, a user may select one preferred tendency of an image process, and the image processing circuit 4 changes the process type in accordance with the category selected by the user and executes by priority a process that is matched with a conceptual image given by the selected category to the user.

Figure 3B:
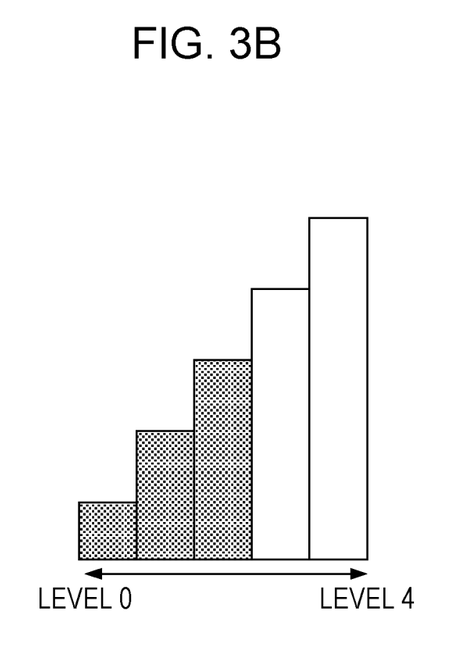
FIG. 3B illustrates an example of a user interface usable for select a level indicative of intensity of a special effect process.

FIG. 3B illustrates an example of a UI screen showing levels representing intensities of special effect processes. Each of the levels of special effect processes refers to a magnitude of change between images usable by a camera for automatically determining settings for a special effect or a bracketing process. The level may be changed to change details for a process to generate images having a larger or a smaller change therebetween. For example, as a tolerance for an exposure correction amount for exposure bracketing, one positive and negative increment stops are provided for Level 0 while four positive and negative increment stops are provided for Level 4, allowing a wide selection of levels of the tolerance.

Next, in step S202, the system control unit 5 selects a proper bracket based on the photographing scene analyzed in step S200. In other words, the system control unit 5 selects one parameter to which a bracket is to be applied from a plurality of types of parameter. Thus, the type of auto bracketing to be used may be automatically judged based on the photographing scene analysis result.

According to this exemplary embodiment, the parameters may include an exposure bracket to change an exposure amount, a focus bracket to change a focus position, and a WB bracket to change a white balance coefficient, for example. The parameters may further include a shutter speed bracket to change a shutter speed for photographing and a timing bracket to change timing for releasing a shutter. According to this exemplary embodiment, a proper parameter is selectable from a plurality of types of parameter based on a given photographing scene. Thus, the system control unit 5 may execute one type of auto bracketing selected from a plurality of types of auto bracketing.

Having described the example in which different parameters are changed for respective types of bracketing, but an embodiment of the present invention is not limited thereto. For example, parameters to be changed may partially overlap between a plurality of types of auto bracketing as far as a plurality of parameters are to be changed for each of the types of auto bracketing. It may only be required that the settings for the parameters are different from each other between a plurality of types of auto bracketing.

Figure 4:
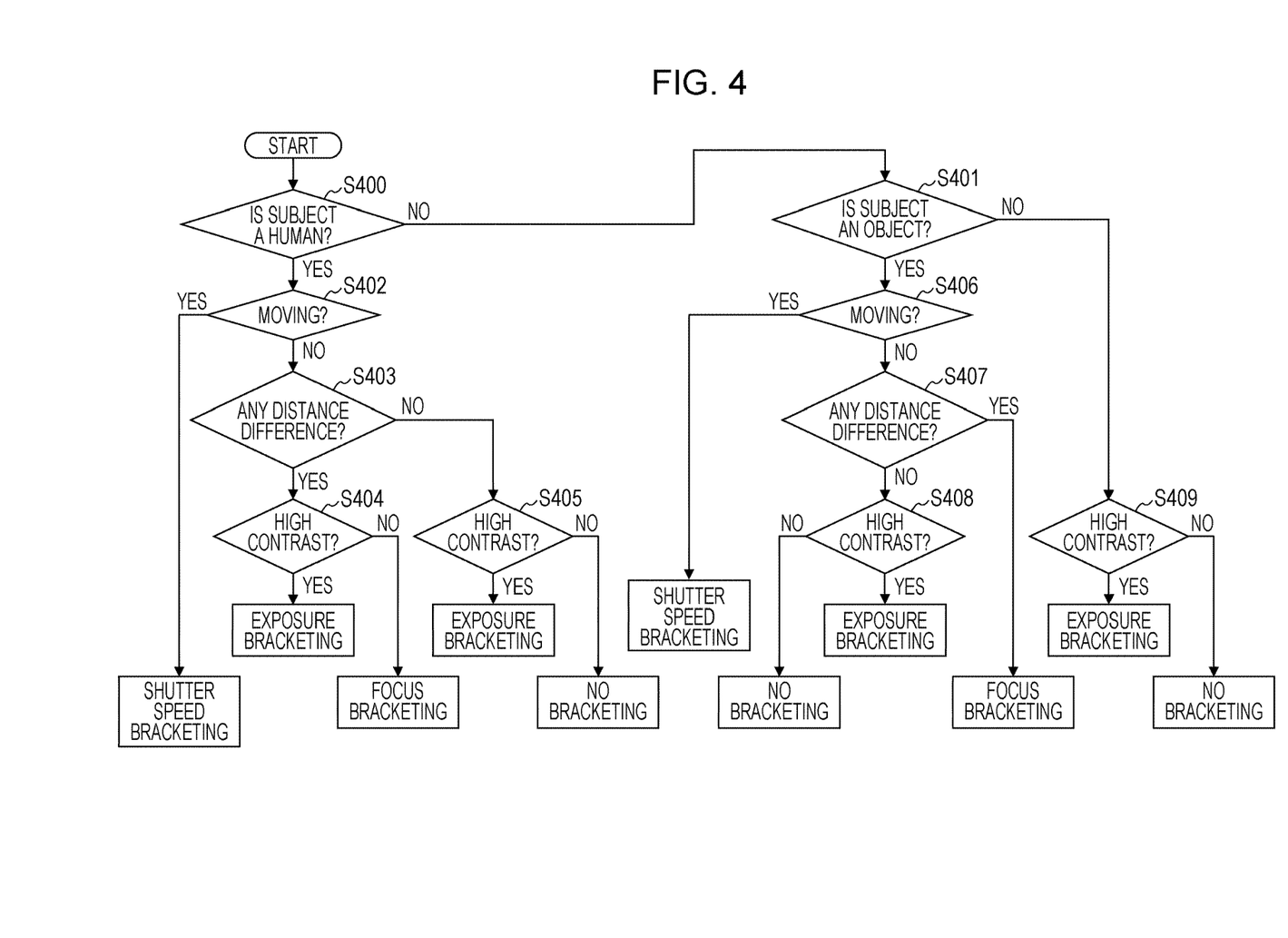
FIG. 4 is a flowchart illustrating a process for selecting a parameter.

Next, an algorithm for selecting a parameter suitable for a given photographing scene in an exemplary imaging apparatus having exposure bracketing, focus bracketing, and shutter speed bracketing functions (that is, three types of parameter) will be described with reference to FIG. 4. FIG. 4 illustrates an example flowchart of an algorithm for selecting a parameter according to this exemplary embodiment. Steps illustrated in FIG. 4 are executed generally in response to a command from the system control unit 5.

First, in steps S400 and S401, the system control unit 5 performs subject judgment based on the subject detection result obtained in step S200 in FIG. 2. From the subject judgment result, which of three types of subject of human, object and others (in a scene without a specific subject such as a landscape scene) the subject corresponds to is judged. If the subject corresponds to a human, the processing moves to step S402. If the subject corresponds to an object, the processing moves to step S406. If the subject corresponds to others, the processing moves to step S409.

In step S402 or step S406, the system control unit 5 performs motion judgment based on the motion detection result obtained in step S200 in FIG. 2. As a result of the motion judgment, if it is judged that at least one subject exists within a photographing angle of view and that camera shake or a subject motion (motion) (or the imaging apparatus 100 or the subject is moving) is occurring, the shutter speed bracketing is selected. The shutter speed bracketing may allow a plurality of photographing operations by changing the shutter speed for photographing to avoid different representations of a subject's motion or photographing failures due to camera shake or subject blur. A gyroscope sensor is provided in the imaging apparatus 100 as a detecting unit configured to detect a motion of the imaging apparatus 100 or a subject so that camera shake may be detected from an output of the gyroscope sensor. A subject in an EVF display image may be tracked by pattern matching, for example, to detect the movement amount.

In step S402 or step S406, if it is judged that the subject is still, the processing moves to step S403 or step S407, respectively. In step S403 or step S407, the system control unit 5 performs focus judgment based on a focus scan result (AF information) obtained in step S200 in FIG. 2. According to this exemplary embodiment, for each subject included in a photographing angle of view, a distance from the imaging apparatus 100 to the subject and a distance from the subject to a background are deduced. In a case where a plurality of subjects exist and there are different positional relationships between their distances (or there is a (large) distance difference), focus bracketing is given priority which performs photographing by adjusting the focus on each subject. In a photographing scene where such focus adjustment on a subject is difficult because the subject has low contrast or close-up (or macro) photography is accomplished, the focus bracketing may be performed at a plurality of predetermined focus positions.

If it is determined in step S403 that there is a (large) distance difference, the processing moves to step S404. On the other hand, if it is determined in step S403 that there is no (or a small) distance difference, the processing moves to step S405. If it is determined in step S407 that there is a (large) distance difference, focus bracketing is selected. On the other hand, if it is determined in step S407 that there is no (or a small) distance difference, the processing moves to step S408.

In step S404, S405, S408, or S409, the system control unit 5 performs histogram judgment based on a histogram analysis result obtained in step S103 in FIG. 2. According to this exemplary embodiment, a histogram of luminance in the EVF display image is generated so that contrast judgment may be performed based on a distribution of the histogram. If it is judged that the photographing scene has large contrast and an exposure amount is difficult to set, exposure bracketing is selected which performs a plurality of photographing operations by changing the exposure amount.

On the other hand, if it is judged in step S404 that the photographing scene has small contrast, focus bracketing is selected. If it is judged in step S405, S408, or S409 that the photographing scene has small contrast, it is determined that none of the auto bracketing functions is effective, and auto bracketing is not performed. In a case where it is judged that auto bracketing is not necessary for the photographing scene as described above, normal single photographing is performed so that the photographing time may get shorter than a case where auto bracketing is performed. However, this exemplary embodiment is not limited thereto but it may be configured such that one of bracketing functions (such as exposure bracketing) is always selected. In this case, it may be configured such that a preset auto bracketing function is performed.

According to this exemplary embodiment, if a photographing scene judging unit judges that there is a distance difference equal to or larger than a predetermined distance between at least two subjects included in a photographing scene, a photographing unit performs focus bracketing. If the photographing scene judging unit judges that the contrast of the photographing scene is higher than a predetermined contrast, the photographing unit performs exposure bracketing. If the photographing scene judging unit judges that a subject in the photographing scene or the imaging apparatus is moving, the photographing unit performs shutter speed bracketing or continuous photographing.

According to this exemplary embodiment, a selecting unit changes one parameter to be selected from a plurality of types of parameter based on the type of a subject included in a photographing scene. The photographing unit performs single photographing or a predetermined type of auto bracketing if any of criteria used by the selecting unit is not satisfied.

According to this exemplary embodiment, for a photographing scene in which focus bracketing and exposure bracketing are both possible, exposure bracketing has a higher priority level based on a result of the histogram judgment if a given subject is a human. On the other hand, focus bracketing may have a higher priority level if the subject is an object. However, this exemplary embodiment is not limited thereto.

The imaging apparatus 100 of this exemplary embodiment may automatically judge a proper parameter (or proper bracketing function) based on a photographing scene (photographing scene information) obtained in a photographing standby state according to the algorithm described with reference to FIG. 4. As an alternative example of this exemplary embodiment, the combination of types of bracketing or the criteria may be changed according to a different configuration from that of the algorithm in FIG. 4. For example, it may be configured such that continuous photographing is selected if it is judged that the imaging apparatus 100 or a subject is moving.

The category selected in step S201 is considered to determine the variance range of the determined bracketing function. An example of the process will be described below.

For example, when exposure bracketing is selected, the variance range of the exposure correction amount therefor is set in consideration of a balance of brightness between a subject and a background, for example, to fall within a predetermined range. The variance range, that is, the range of change of the exposure correction amount may be preset based on the selected category.

Figure 5:
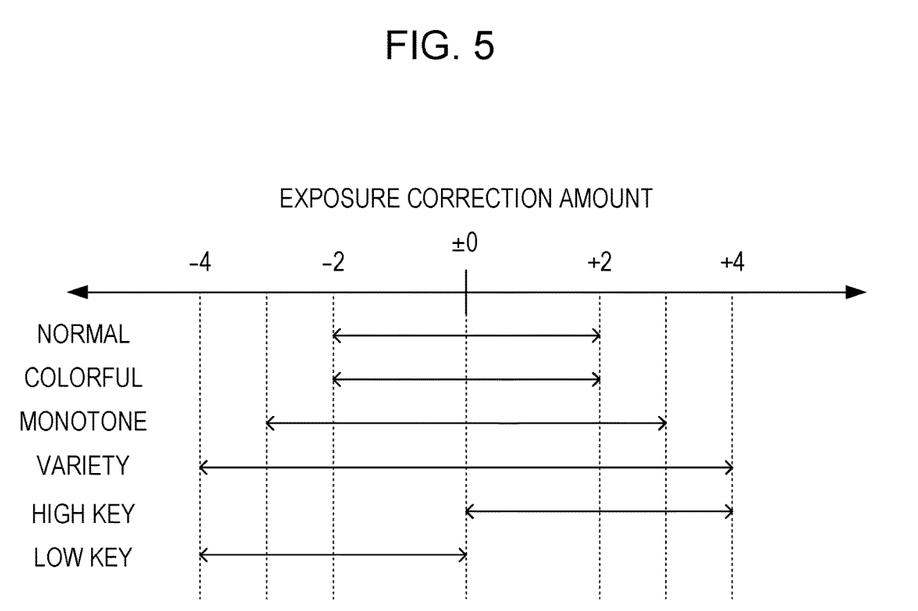
FIG. 5 illustrates upper limits and lower limits of variance ranges of an exposure correction amount based on categories.

FIG. 5 illustrates upper limits and lower limits of the variance ranges of exposure correction amount for the categories. When AUTO or COLORFUL is selected as the category, the upper limit of the exposure correction amount is set to +2 increment stops and the lower limit is set to −2 increment stops with reference to a proper exposure amount. When MONOTONE is selected as the category, the upper limit of the exposure correction amount is set to +3 increment stops and the lower limit is set to −3 increment stops. This is because a large difference in luminance value between images may easily show differences between a plurality of image obtained by auto bracketing since images to be processed when a monotone category is selected have no tint or less tint. When VARIETY is selected as the category, the upper limit of the exposure correction amount is set to +4 increment stops and the lower limit is set to −4 increment stops. A larger range of exposure correction amount is set because the category VARIETY is selected to intentionally largely differentiate between images obtained by auto bracketing.

When HIGH KEY is selected as the category, a proper exposure amount is set as the lower limit, and the upper limit is set to +4 increment stops. The exposure correction amount is set such that images obtained by exposure bracketing are shifted to the higher luminance side because the HIGH KEY category is intended for images having a higher luminance on a whole screen. When LOW KEY is selected as the category, a proper exposure amount is set as the upper limit, and the lower limit is set to −4 increment stops. The exposure correction amount is set such that images obtained by exposure bracketing are shifted to the lower luminance side because the LOW KEY category is intended for images having a lower luminance on a whole screen.

A variance range may be set based on the selected category as described above by changing the variance range of exposure correction amount for exposure bracketing, moving a center position of the variance range of exposure correction amount to from a proper exposure amount or a combination thereof, for example.

This is not limited to a case where exposure bracketing is selected but is applicable to a case where shutter speed bracketing is selected, for example. For example, when VARIETY is selected as the category, the upper limit of the shutter speed correction amount is set to +4 increment stops and the lower limit is set to −4 increment stops with reference to a proper shutter speed. When a different category from it is selected, the upper limit of the shutter speed correction amount is set to +2 increment stops, and the lower limit is set to −2 increment stops.

In this way, a subject keeping a same condition may be captured by changing the combination of parameters selected for auto bracketing based on the category selected by a user. Thus, user's intention may not only be reflected on images obtained by auto bracketing, but user's intention may also be reflected on a difference between the plurality of images obtained by auto bracketing.

In step S203, the system control unit 5 changes the value of one parameter selected in step S202 above to perform auto bracketing. The plurality of captured image data pieces are stored in the memory 3 in the imaging apparatus 100.

Next, in step S204, the image processing circuit 4 determines the details of a bracketing image process to be performed on the plurality of image data pieces, and the bracketing image process is performed under the condition determined in step S205. A method for performing a bracketing image process in step S205 in FIG. 2 on a bracketed image will be described with reference to FIG. 6.

Figure 6:
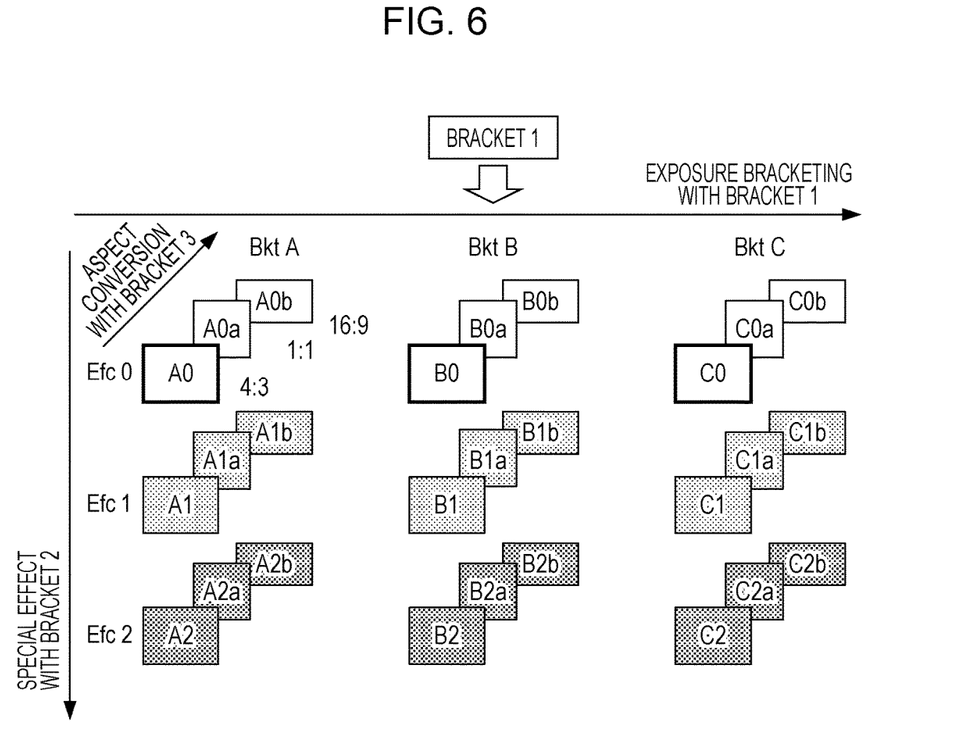
FIG. 6 illustrates an example of an image group generated by bracketing.

FIG. 6 illustrates examples of image groups generated by a bracket image process. Referring to FIG. 6, a bracket 1 is a parameter (or type of bracket) selected in step S202 in FIG. 2. The bracket 1 performs auto bracketing on the selected one type of parameter to capture N images (where exposure bracketing is performed and N=3). The bracket 1 corresponds to the auto bracketing performed in step S203 in FIG. 2.

A bracket 2 and a bracket 3 in FIG. 6 are bracketing image processes to be performed in the image processing in step S204 in FIG. 2. According to this exemplary embodiment, a modification process (special effect process) which converts color saturation, color phase, luminance, and sharpness, for example, is set as the bracket 2. A process (aspect conversion process) which converts an aspect by performing cut-out processing on an image is set as the bracket 3. The special effect process and the aspect conversion process generate three types of bracketed images.

That is, the bracket 1 (auto bracketing) generates three types of image of Bkt A (−2 stop increments), Bkt B (0 stop increments), and Bkt C (+2 stop increments). The bracket 2 (special effect) generates images having undergone three types of special effect process Efc 0, Efc 1, and Efc 2. The bracket 3 (aspect conversion) generates images with aspect ratios A0 (4:3), A0 a (1:1), and A0b (16:9). Thus, according to this exemplary embodiment, 3×3×3=27 types of image are generated finally by one photographing operation.

Therefore, the image processing circuit 4 may perform bracketing image processes by changing the values of a plurality of parameters that are different from those for auto-bracketing on captured images obtained by the photographing unit to generate a plurality of images. In other words, the image processing circuit 4 may handle images obtained by auto bracketing as input images and performing a modification process on the input images so that more output images than the input images may be generated.

In this case, the modification process may vary, in addition to the aforementioned processes, such as a process for blurring away a whole image, a process for distorting a whole image, a process for emphasizing a contrast of a whole image and a process for correcting an aberration of an image. Therefore, many combination patterns of image processes including the special effect and the aspect conversion are possible. When a combination of all of the image processes is applied to perform bracket image processing, a large number of images may be generated as a result.

According to this exemplary embodiment, the image processing circuit 4 automatically selects a modification process to be performed in the bracketing image process on a plurality of images obtained by auto bracketing. A method for automatically selecting a combination of bracketing image processes will be described. In the following description, the exposure bracketing is selected for the auto bracketing (bracket 1) and the special effect filtering process and the aspect conversion process are used for the bracketing image process (brackets 2 and 3). It is assumed that the exposure bracketing generates three images as described above.

Figure 7:
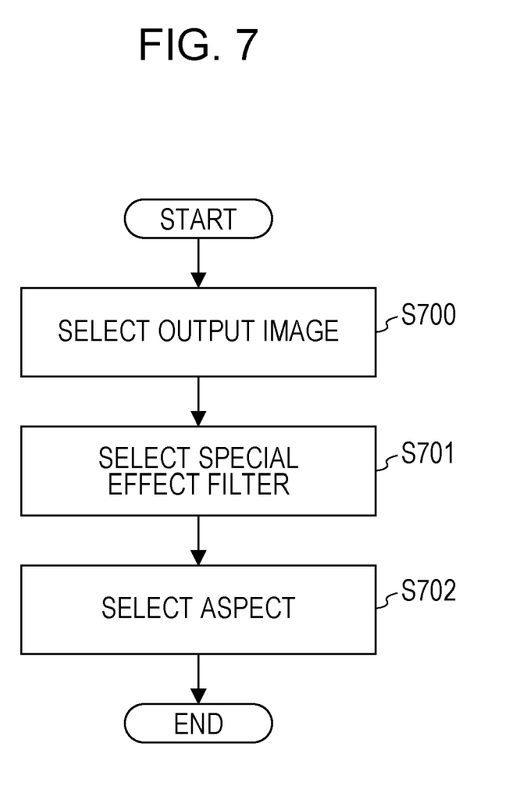
FIG. 7 is a flowchart for determination of settings for image processing for bracketing.

FIG. 7 is a flowchart illustrating determination of details of the bracketing image process.

First, in step S700 in FIG. 7, the system control unit 5 determines a processing detail of images to be output finally. For example, when a user needs M images, the system control unit 5 determines a detail (processing path) of a modification process for generating M images from images of 27 patterns illustrated in FIG. 6 (where M=6).

Here, the method for determining a processing path includes selecting suitable paths for M images from some predetermined patterns based on the selected type of bracket and a result of the subject judgment. For example, when the bracket 1 is exposure bracketing, processing paths for M images are determined such that more images generated from over-exposure images may be selected.

It should be noted that it may be configured such that the selection of the value M and processing paths may be designated in advance freely by a user.

Next, in step S701, the system control unit 5 determines a detail of the special effect filtering process to be added to the images. The special effect filtering may include a process for converting the color phase, color saturation, brightness or sharpness of a whole or partial image. This will be described in more detail below with reference to FIG. 8.

Figure 8:
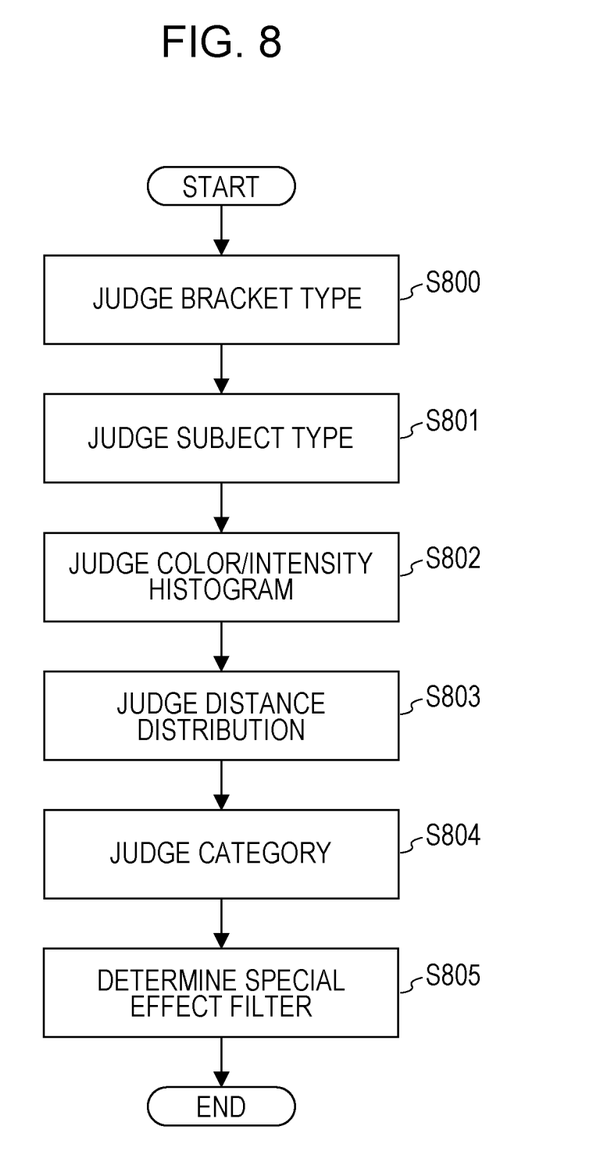
FIG. 8 is a flowchart of a special effect filtering process.

FIG. 8 is a flowchart of the special effect filtering process. According to this exemplary embodiment, the imaging apparatus includes a P type special effect filter, and the priority levels that correspond to probabilities of use depend on filter weights W[i] (i=0, 1, . . . , P). In step S800, the system control unit 5 changes the weight W based on the type of the bracket 1. For example, when the bracket 1 is exposure bracketing, a special effect filter for changing a color phase and a color saturation is given priority over a special effect filter for changing brightness. In other words, the filter weights W[i] are weighted to prioritize a parameter having a different influence from the parameter changed by the bracket 1. More specifically, coefficients p1 [i] (i=0, 1, . . . , P) are prepared in advance for changing the weighting based on the type of the bracket 1. The weights W[i] and the coefficients p1 [i] are multiplied as in Expression (1) below to acquire new weights W[i].

$$W[i]=W[i]\times p1[i] \quad (1)$$

In step S801, the system control unit 5 multiplies the weights W[i] acquired in step S800 by new coefficients p2 [i] (i=0, 1, . . . , P) based on the subject judgment result as in Expression (2) to acquire new weights W[i]. The coefficients p2 [i] may be set to satisfy the following conditions, for example.

(1) In a case where a subject is a human, a special effect filter for sepia-tone or soft-focus has priority, and the weight for the special effect filter is reduced such that the color phase of flesh color may be largely changed.

$$W[i]=W[i]\times p2[i] \quad (2)$$

In step S802, the system control unit 5 multiplies the weights W[i] obtained in step S801 by new coefficients p3 [i] (i=0, 1, . . . , P) as in Expression (3) below to obtain new weights W[i]. The coefficients p3 [i] are set based on a color distribution and a luminance distribution of captured image. A histogram of luminance (Y), color saturation (Chroma) and color phase (Hue) is generated from each of image data captured by the bracket 1, and the coefficient p3 [i] (i=0, 1, . . . , P) are set based on the results.

$$W[i]=W[i]\times p3[i] \quad (3)$$

The coefficients p3 [i] may be set to satisfy the following condition, for example.

(2) When it is determined from the luminance histogram that the captured images have low contrast, a special effect filter for performing contrast emphasis processing may have higher priority.

(3) When it is determined that the captured images have many regions having blocked up shadows and blown out highlights, a special effect filter may have higher priority which constructs another image with a different exposure amount and enlarges the dynamic range with it (only in a case where exposure bracketing has been performed by the bracket 1).

(4) When it is determined from the color saturation histogram that the captured images have high color saturation, a special effect filter which emphasizes color saturation may have higher priority.

(5) When it is determined from the color phase histogram that the captured images have many blue regions, a special effect filter which emphasizes a blue color saturation may have higher priority.

In step S803, the system control unit 5 multiplies the weights W[i] obtained in step S802 by new coefficients p4 [i] (i=0, 1, . . . , P) as in Expression (4) below to obtain new weights W[i]. The coefficients p4 [i] may be set based on a distance distribution of a subject within captured images and may be set to satisfy the following conditions, for example.

(6) When it is determined that a large distance difference exists between the subject and a background, a special effect filter which blurs away the background (by reducing the sharpness) is given higher priority.

$$W[i]=W[i]\times p4[i] \quad (4)$$

In step S804, the system control unit 5 multiplies the weights W[i] obtained in step S803 by new coefficients p5 [i] (i=0, 1, . . . , P) as in Expression (5) below to obtain new weights W[i].

$$W[i]=W[i]\times p5[i] \quad (5)$$

The coefficients p5 [i] may be set based on the category selected by a user in step S201 in FIG. 2 and may be set to satisfy the following conditions, for example.

(7) When AUTO is selected as the category, the weighting on all special effect filter is equal to 1, and all special effect filters are handled equally.

(8) When MONOTONE is selected as the category, a special effect filter which reduces color saturation is given higher priority while the coefficients p5 for a special effect filter which emphasizes color saturation is set to 0.

(9) When COLORFUL is selected as the category, a special effect filter which emphasizes color saturation is given higher priority while the coefficients p5 for a special effect filter which reduces color saturation is set to 0.

(10) When VARIETY is selected as the category, a special effect filter which has a large influence on the appearance of the images is given higher priority.

(11) When HIGH KEY or LOW KEY is selected as the category, a special effect filter which changes luminance of a whole screen is given higher priority.

Figure 9A:
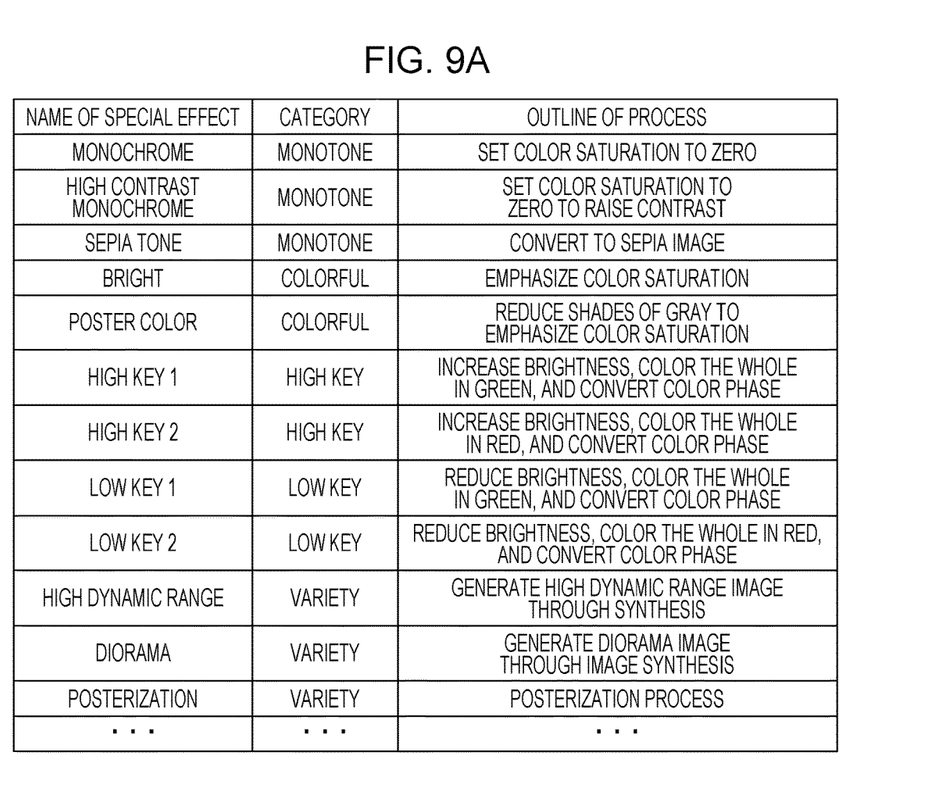
FIG. 9A and FIG. 9B illustrate examples of combinations of selected categories and prioritized special effect filters.

FIG. 9A illustrates example combinations of selected categories and special effect filters to be given higher priority. Having described the example in which the priority level of a special effect filter is changed based on the selected category, a process parameter in the same special effect filter may be changed based on the selected category.

Figure 9B:
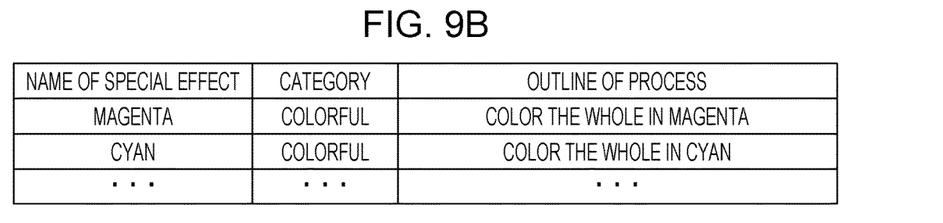

When a user selects COLORFUL as the category but the color saturation of the images is significantly low, implementation of a special effect filter that fits to the category selected by the user may not possibly change the images. In this case, an auxiliary special effect filter as illustrated in FIG. 9B is applied which is separately provided from the special effect filter illustrate din FIG. 9A. When a user selects COLORFUL as the category but the color saturation of the images is significantly low, another special effect filter is applied which changes a color phase of a color included in the image instead if emphasis of color saturation. Thus, differences in tint may occur between the plurality of images, reflecting the user's intention when viewing them as an image group though the colors included in the generated images are not conspicuous.

In step S805, the system control unit 5 determines a special effect filter to be applied based on the weights W[i] obtained in step S804. In this case, the special effect filter determining method may include selecting M final weights W[i] in decreasing from the highest one. Alternatively, the system control unit 5 may obtain new weights W[i] by multiplying the weights W[i] obtained in step S804 by a random number and select M of the new weights W[i] in decreasing order from the highest one. The random number may be a value for selecting various special effect filters moderately but may be set within a range that has a smaller influence on the weights W[i] than those of the coefficients p1 to p5.

When AUTO is selected as the category, all special effect filters are targets to be selected. When MONOTONE is selected, a part of the special effect filter is excluded from the target. When AUTO is selected as the category, the coefficients p5 give equal values to all special effect filters. On the other hand, a different one from it is selected as the category, values based on the selected category are given as the coefficients p5. In this manner, bracketing image process to be performed by the image processing circuit 4 may change a combination of details of the modification process based on the category selected by a user even when one image is a processing target thereof. Thus, a user's intention may be reflected on the images obtained by performing the bracketing image process, and a user's intention may be reflected on differences between a plurality of images obtained in the bracketing image process.

A special effect filter to be applied to images may be determined based on the type of auto bracketing and an analysis result of a captured image, as described above.

Referring back to FIG. 7, the system control unit 5 determines details of the aspect conversion process in step S702. The aspect ratio of an image having undergone the aspect conversion process is determined based on the image size before the aspect conversion and a result of the subject judgment. For example, when a given subject is a human figure, a 3:4 vertically-oriented composition may be given higher priority. When a given subject is a landscape, a 16:9 horizontally-oriented composition may be given higher priority. Alternatively, one aspect may be selected randomly from aspects prepared in advance.

When a trimming size is determined based on a result of the subject judgment and a trimming process is performed based on the size of the subject appearing small in the image, the perceived resolution of the displayed image may be degraded because a smaller number of pixels are included in the image after the trimming process. Accordingly, a general automatic trimming process sets a lower limit of a trimmable size so that trimming may be performed within the range.

On the other hand, according to this exemplary embodiment, when a user selects VARIETY as the category, a bold trimming process is allowed. Therefore, the lower limit value of the trimmable size may be set lower than that of a case where other categories are selected. As illustrated in FIG. 3B, when a user changes the level of a special effect process, the lower limit value of the trimmable size may be change based on the changed level.

In step S205 in FIG. 2, the image processing circuit 4 performs an image process based on the special effect filter selected in step S701 in FIG. 7 and the aspect ratio selected in step S702 to generate M images.

One type of auto bracketing selected optimally from a plurality of types of auto bracketing is used for performing auto bracketing, and bracketing processing with image processing is performed with respect to a special effect and an aspect conversion process, as described above. Thus, a plurality of images are generated by one photographing operation so that a plurality of image representations different from each other may be presented.

It has been described that, according to this exemplary embodiment, priority levels are given to modification processes applying special effect filters, paths of the modification processes are determined, and aspect conversion processes for the paths are determined. However, an embodiment of the present invention is not limited thereto. Priority levels may be given not only to modification processes applying special effect filters but also to aspect conversion processes, and the paths of the processes may then be determined. One image on which no special effect process and no aspect conversion process is performed and for which parameters are set to proper values may be kept among a plurality of images obtained by performing auto bracketing.

When the bracketing image process performed by the image processing circuit 4 completes, the processing moves to step S206 in FIG. 2. In step S206, the system control unit 5 displays the generated images (stored in the memory 3) on a display unit 11. In this case, a user may select an image to be recorded from the generated images and save it in a recording medium 10.

The imaging apparatus according to this exemplary embodiment may automatically select proper type of auto bracketing based on an analysis result of a given photographing scene, which may reduce the probability of photographing failure and provide a desirable image to a user at a higher probability. By combining a plurality of types of image processing such as special effects and image cut-out processing to be applied on a captured image, images having a plurality of different image representations may be easily obtained. Thus, according to this exemplary embodiment, an apparatus supporting auto bracketing suitable for a given photographing scene may be provided which does not require complicated setting operations and advanced knowledge.

According to this exemplary embodiment, auto bracketing and special effect filters may both be used to generate a plurality of image, for example, but either one process may be used. Therefore, even an image processing apparatus without a photographing function may provide the same effects. In this case, a user may select one image and instruct to execute bracketing image process on the image so that a plurality of images may be generated by applying image processing parameters that are automatically differentiated. In this case, the instruction to execute bracketing image process made by a user may correspond to one image generation instruction from a user, instead of a photographing instruction given by full press of a release button.

Having described exemplary embodiments of the present invention above, the present invention is not limited to the exemplary embodiments, and various changes, modification and alterations may be given without departing from the scope and spirit of the invention.

The present invention may be implemented by executing the following processes. That is, software (or a program) that implements a function of the exemplary embodiments may be provided to a system or an apparatus over a network or through a storage medium, and a computer (or CPU, MPU or the like) in the system or apparatus may read out and execute the program code. In this case, the program and the storage medium storing the program are included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-123215, filed Jun. 11, 2013 and No. 2014-100824 filed May 14, 2014, which are hereby incorporated by reference herein in their entirety.

What is claimed is:

1. An imaging apparatus comprising:
an imaging unit that includes an imaging optical system and an imaging device;
a system control circuit that determines a photographing scene based on a result of analysis on an image captured in advance by the imaging unit, selects one type of auto bracketing from a plurality of types of auto bracketing based on the determined photographing scene, causes the imaging unit to perform the one type of auto bracketing, and selects a predetermined number of modification processes from among a plurality of modification processes; and
an image processing circuit that performs the predetermined number of modification processes on a plurality of images generated by the one type of auto bracketing to generate output images,
wherein the system control circuit changes at least one of an upper limit, a lower limit, and a center value of a variance range of a value of at least one photographing parameter to be changed during the one type of auto bracketing based on a category instructed by a user, and
wherein the system control circuit selects the predetermined number of modification processes based on results of analysis on the plurality of images generated by the one type of auto bracketing and the category.

2. The imaging apparatus according to claim 1, wherein the photographing parameters to be used for the one type of auto bracketing are set within the variance range based on the result of analysis on the image.

3. The imaging apparatus according to claim 1, wherein the at least one photographing parameter to be changed during the one type of auto bracketing include at least one of an exposure amount, a focus position, a white balance coefficient, and a shutter speed.

4. The imaging apparatus according to claim 1, wherein the result of analysis on the image includes at least one of a result of judgment of whether a subject included in the image is a human figure, a result of judgment of whether a subject included in the image is moving, a result of judgment of distance differences between a plurality of subjects included in the image, and a result of judgment of a degree of contrast of the image.

5. The imaging apparatus according to claim 1, wherein the system control circuit sets priority levels for the plurality of modification processes based on the results of analysis on the plurality of images and the category; and
selects the predetermined number of modification processes from among the plurality of modification processes based on the set priority levels.

6. The imaging apparatus according to claim 5, wherein the system control circuit sets priority levels for the plurality of modification processes based on the results of analysis on the plurality of images, the category, and random numbers.

7. A control method for an imaging apparatus having an imaging unit that includes an imaging optical system and an imaging device, the method comprising:
receiving an instruction for a category;
determining a photographing scene by analyzing an image captured in advance by the imaging unit;
selecting one type of auto bracketing from a plurality of types of auto bracketing based on the determined photographing scene;
causing the imaging unit to perform the one type of auto bracketing;
selecting a predetermined number of modification processes from among a plurality of modification processes; and
performing, the predetermined number of modification processes on a plurality of images generated by the one type of auto bracketing to generate output images,
wherein at least one of an upper limit, a lower limit, and a center value of a variance range of a value of at least one photographing parameter to be changed during the one type of auto bracketing is changed based on the category, and
wherein the predetermined number of modification processes are selected based on results of analysis on the plurality of images generated by the one type of auto bracketing and the category.

8. A non-transitory computer-readable storage medium storing computer executable instructions which cause a computer to execute the control method for an imaging apparatus according to claim 7.

\* \* \* \* \*